United States Patent
Braunstein et al.

(10) Patent No.: US 6,920,008 B2
(45) Date of Patent: Jul. 19, 2005

(54) SLIDER FLY-HEIGHT MEASUREMENT USING VISCOELASTIC MATERIAL

(75) Inventors: David Braunstein, Campbell, CA (US); Qing Dai, San Jose, CA (US); Bruno Marchon, Palo-Alto, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 112 days.

(21) Appl. No.: 10/676,734

(22) Filed: Sep. 30, 2003

(65) Prior Publication Data

US 2005/0068660 A1 Mar. 31, 2005

(51) Int. Cl.$^7$ .................................................. G11B 5/60
(52) U.S. Cl. ................................... 360/75; 360/135
(58) Field of Search ...................... 360/75, 69, 78.04, 360/135; 73/1.81; 324/212

(56) References Cited

U.S. PATENT DOCUMENTS

| | | | | |
|---|---|---|---|---|
| 5,675,462 A | * | 10/1997 | Ayabe | 360/135 |
| 5,689,057 A | * | 11/1997 | Baumgart et al. | 73/1.01 |
| 5,808,736 A | * | 9/1998 | Womack et al. | 356/243.3 |
| 5,956,217 A | * | 9/1999 | Xuan et al. | 360/135 |
| 6,164,118 A | * | 12/2000 | Suzuki et al. | 73/1.89 |
| 6,275,029 B1 | * | 8/2001 | Schaff | 360/75 |
| 6,408,677 B1 | * | 6/2002 | Suzuki | 73/1.89 |
| 2001/0035960 A1 | | 11/2001 | Johnston | |
| 2002/0001151 A1 | | 1/2002 | Lake | |
| 2002/0071196 A1 | | 6/2002 | Chapin et al. | |
| 2002/0097517 A1 | | 7/2002 | Bonin et al. | |
| 2002/0176185 A1 | | 11/2002 | Fayeulle et al. | |
| 2003/0007279 A1 | | 1/2003 | Johnson et al. | |
| 2003/0058559 A1 | | 3/2003 | Brand et al. | |
| 2003/0067698 A1 | | 4/2003 | Dakroub et al. | |
| 2003/0086200 A1 | * | 5/2003 | Tokizono et al. | 360/78.06 |

* cited by examiner

Primary Examiner—David Hudspeth
Assistant Examiner—James L Habermehl
(74) Attorney, Agent, or Firm—G. Marlan Knight

(57) ABSTRACT

A method is presented for measuring the height of an air-bearing separating a flying component from a rotating surface using physical deformation of a small amount of material deposited on the surface. One embodiment of the invention is a method of measuring the fly-height of a slider using physical deformation of material deposited on the disk. Small amounts of the deformable material such as a viscoelastic lubricant are placed on a limited area of the disk so that the slider can otherwise fly normally. The slider's fly-height is established over the unaltered portion of the disk, then the slider impacts the deformable material. This process results in the deformable material being flattened or removed above the fly-height of the slider. The height of the remaining material is then measurable as the fly-height.

17 Claims, 3 Drawing Sheets

SLIDER FLY-HEIGHT MEASUREMENT USING VISCOELASTIC MATERIAL

FIELD OF THE INVENTION

The invention relates to methods for measuring the flying height of sliders for use in magnetic storage devices.

BACKGROUND OF THE INVENTION

In a typical prior art magnetic disk recording system a slider containing magnetic transducers for reading and writing magnetic transitions is urged toward the rotating disk by a suspension. An air-bearing develops under the slider and causes it to fly. The term "fly-height" and air-bearing height will be used interchangeably herein.

A slider fly-height of less than 10 nm is required for areal densities of 60 Gb/in2 and greater. To reach the 1 Tb/in$^2$ mark, fly-heights in the 2–3 nm range are needed. Accordingly, it is becoming increasingly difficult to measure the actual fly-height of sliders. The most common technique using white light interferometry works adequately for a fly-height above 10 nm, but it looses accuracy below 10 nm. In addition, it is very sensitive to the optical constants of the slider overcoat. Another technique uses small solid bumps of known height on the disk and measures the acoustic emissions as the slider passes over or hits the bumps. Since it is impractical to make bumps below 5 nm in height, this particular technique looses accuracy for very small fly-heights.

In published U.S. patent application 20030067698 (Apr. 10, 2003) by Dakroub, et al. a method is described for measuring the fly-height of a slider using a fixed source write signal applied to an inductive element of the write head, generating a magnetic field with a stray magnetic field portion. A magnetoresistive element of the read head coupled with the magnetic field produces an initial field strength signal. As the disk rotates, the slider flies above the disk decreasing the density of the stray magnetic field portion, thereby, decreasing the amplitude of the field strength signal. The decreasing amplitude of the field strength signal is calibrated to a predetermined operating fly-height profile to correlate fly-height of the slider to the decreasing amplitude of the field strength field.

A method for measuring the fly-height of a slider using a thermal source and a thermal detector is described in published U.S. patent application 20030058559 (Mar. 27, 2003) by Brand, et al.

A laser diode generates light which is reflected off of the disk to a semiconductor laser light detector in the system described in published U.S. patent application 20030007279 (Jan. 9, 2003) by Johnson, et al.

In published U.S. patent application 20020176185 (Nov. 28, 2002) Fayeulle, et al., a method for measuring the fly-height of a slider using a disk with radial grooves in the surface is described. As the disk rotates, the radial grooves pass under the slider and induce a perturbation in the signal. By measuring the perturbations in the signal caused by the grooves in the disk surface, and by processing the measurement signal, a vertical spacing signal proportional to the vertical spacing between the disk and the head can be obtained.

In published U.S. patent application 20020071196 (Jun. 13, 2002) by Chapin, et al., the fly-height detector apparatus comprises a receiver circuit for measuring the frequency of the read/write head; a means perturbing the gap between the read/write head and the data storage surface to invoke a dynamic response in the read/write head; and a processor circuit responsive to the receiver circuit to derive a fly-height in relation to the dynamic response frequency. The processor circuit comprises a memory in which is stored a numerical model describing a functional interrelationship between the fly-height and the read/write head frequency.

In published U.S. patent application 20020097517 (Jul. 25, 2002) by Bonin, et al., a slider is described with a field emission sensor that senses fly-height. The sensor has an electrode tip disposed on the slider. The electrode tip faces a media surface across a gap. The sensor conducts a tunneling current through the gap and provides an output representing the length of the gap.

Published U.S. patent application 20020001151 Jan. 3, 2002 by, J. H. Lake describes a system for measuring fly-height of a slider over a rotatable magnetic disk. The system determines the fly-height of the slider based on the measured pulse width and amplitude of the read back signal.

In published U.S. patent application 20010035960 (Nov. 1, 2001) by M. M. Johnston a method is presented of fly-height testing using a light emitting diode which generates a light that is reflected off the medium and the slider. The reflected light is directed to detectors capable of generating an electrical signal based on the amplitude of at least one wavelength of light in the reflected light. A distance calculator then determines the distance from the slider to the medium based on the electrical signal.

SUMMARY OF THE INVENTION

A method is presented for measuring the height of an air-bearing separating a flying component from a rotating surface using physical deformation of a small amount of material deposited on the surface. One embodiment of the invention is a method of measuring the fly-height of a slider using physical deformation of material deposited on the disk. Small amounts of the deformable material are placed on a limited area of the disk so that the slider's normal flight is unaltered. The slider's fly-height is established over the unaltered portion of the disk, then the slider impacts the deformable material. This process will result in the deformable material being flattened or removed above the fly-height of the slider. The height of remaining material is then measurable as the fly-height. The technique is extremely sensitivity at very low fly-heights and can achieve 0.01 nm accuracy for fly-heights in the 0.1–10 nm range which is far better than the accuracy of prior art white light interferometry.

DETAILED DESCRIPTION OF THE INVENTION AND THE PREFERRED EMBODIMENTS

The invention is preferably implemented using a test setup which simulates a disk drive for fly-height testing. The method of the invention is useful for testing sliders during design or manufacturing. Testing of the fly-height of sliders during a design phase or during manufacturing is typically done after the slider has been integrated into a suspension. The method of the invention is nondestructive, so slider assembly (typically called the head-gimbal assembly—HGA) can be used in a completed disk drive after testing. The disks and sliders used in the measurements can be cleaned by rinsing with a suitable solvent. Although use of the method in a completed disk drive is feasible, it would probably be destructive. The preferred deformable material is a soft viscoelastic material such as non-functionalized Fomblin Z lubricant with a molecular weight of about 10 k Daltons. Fomblin Z is commercially available from Solvay Solexis, Inc. It is based on a linear perfluoropolyether backbone. The functionalized versions of the "Z" lube are end capped with two functional groups specifically designed to have a strong interaction with the disk surface. The structure with end caps X is given by Solvay Solexis as $X-CF_2-O-(CF_2-CF_2-O)_p-(CF_2O)_q-CF_2-X$. The functionalized Z-DOL is commonly used a lubricant on disks. The thickness of Z-DOL on the disk is approximately 1 nm which is below the fly-heights that currently are being studied. In addition, the functionalized Z-DOL will attract moisture which lowers the viscoelasticity and makes it unusable for measuring a fly-height. The non-functionalized "Z" lubricant will spinout to a thickness of several tens of nanometers which will allow a reasonable target range of fly-heights to be measured and it maintains the desired viscoelasticity. Measurement of fly-heights in various ranges will require viscoelastic materials that are adapted to that range. The "Z" lubricant clearly cannot be used to measure a fly-height that is greater than its final thickness on the disk.

Figure 1:
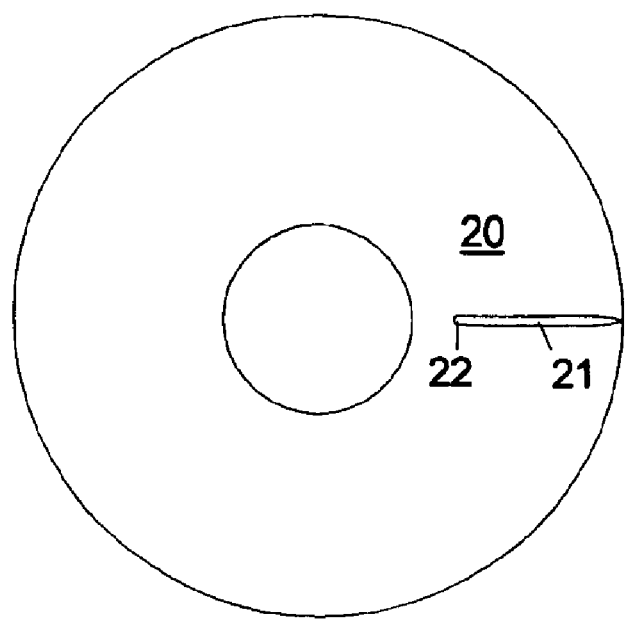
FIG. 1 is an illustration of a disk with a radial line of viscoelastic material applied. according to the invention.
Figure 4:
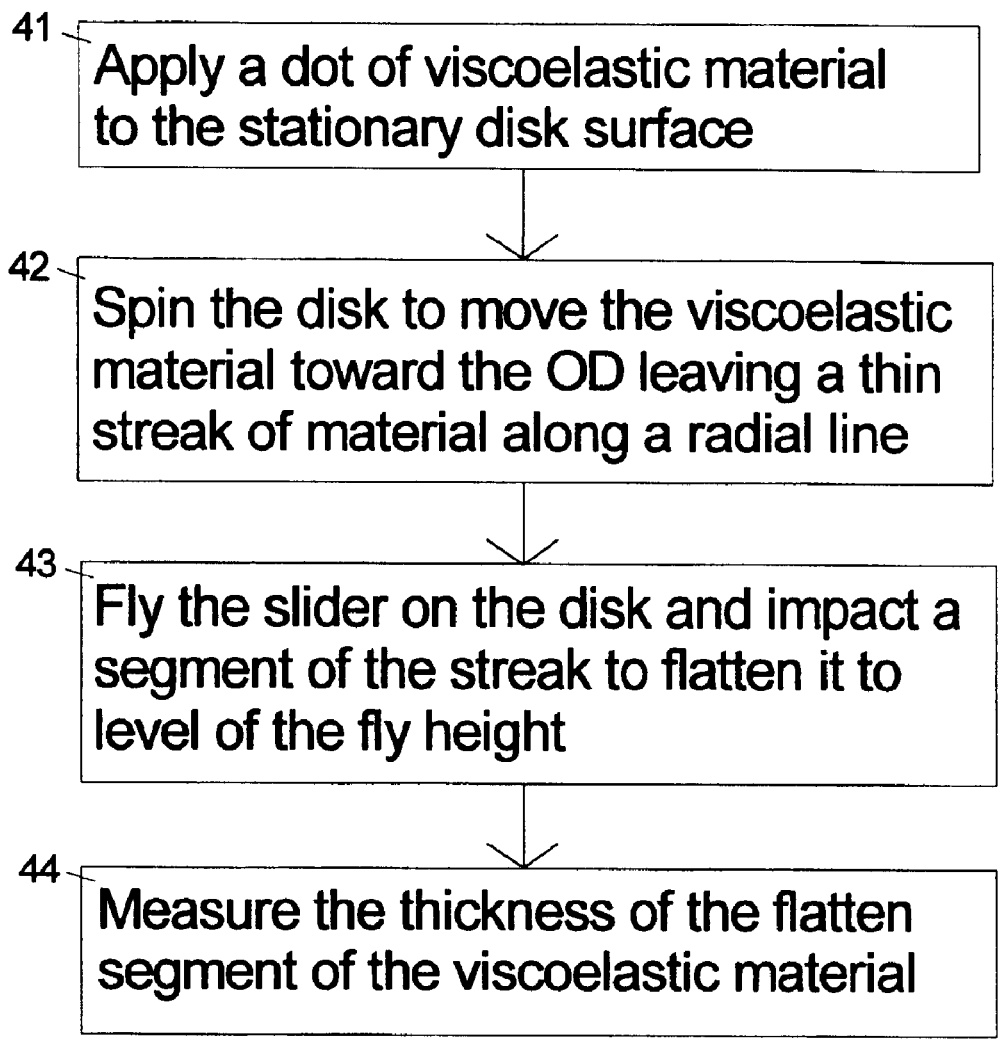
FIG. 4 is a flowchart of the steps in an embodiment of the method of the invention.

FIG. 1 illustrates the preparation of the disk 20 for the fly-height measurement. FIG. 4 gives a flowchart of the method steps. A small drop of the viscoelastic material is placed at a selected location 22 on the flyable area of the disk 20 while the disk is stationary in order to produce a small dot of material 41. The amount of viscoelastic material in the spot is not critical; therefore, a simple technique such as dipping a 10 mil wire in the material and touching the wire to the disk surface can be used. Normal variations in the amount of material in the dot will not result in variations in the final film thickness. After the dot of material is applied, the disk is then rotated at a speed which is high enough to drive the viscoelastic material outward along a radial line toward the outer-diameter (OD) 42. For the Fomblin Z lubricant spinning the disk at 10 k RPM for a few minutes will drive the drop from the inner-diameter (ID) to the OD, leaving a narrow trail several tens of nanometers high to form a streak or ridge 21 in the path of the slider.

The next step in the test procedure is to fly the slider over the disk in the normal manner. The suspension urges the slider toward the surface of the rotating disk and the air-bearing develops due to the relative velocity in the normal manner. The fly-height is related to the speed of rotation, so disk rotation rate should be close to the selected rate at which the slider will function in a completed disk drive. The speed of rotation for flying the slider can be different than the speed needed to force the dot of viscoelastic material toward the OD.

Preferably the streak of viscoelastic material is long enough that the slider can be flown over one section while leaving the rest undisturbed 43. The test fixture preferably removes (unloads) the slider from the disk. Although the details of how and where the slider is flown are not critical to success and many different procedures can used, one especially preferred procedure will be described. The slider is loaded onto the disk surface near the OD while the disk is rotating. The slider is allowed to stabilize its flight. The slider is then moved in toward the ID of the disk to a selected track where the slider is flown for a few seconds adjacent to the undisturbed portion of the streak. The slider is then unloaded. This procedure leaves an inner portion of the ridge of viscoelastic material undisturbed and creates a crisp transition to the flatten material at a know location. The loading process creates a certain amount of turbulence, so the preferred process also avoids using the loading area for the measurement.

Figure 2:
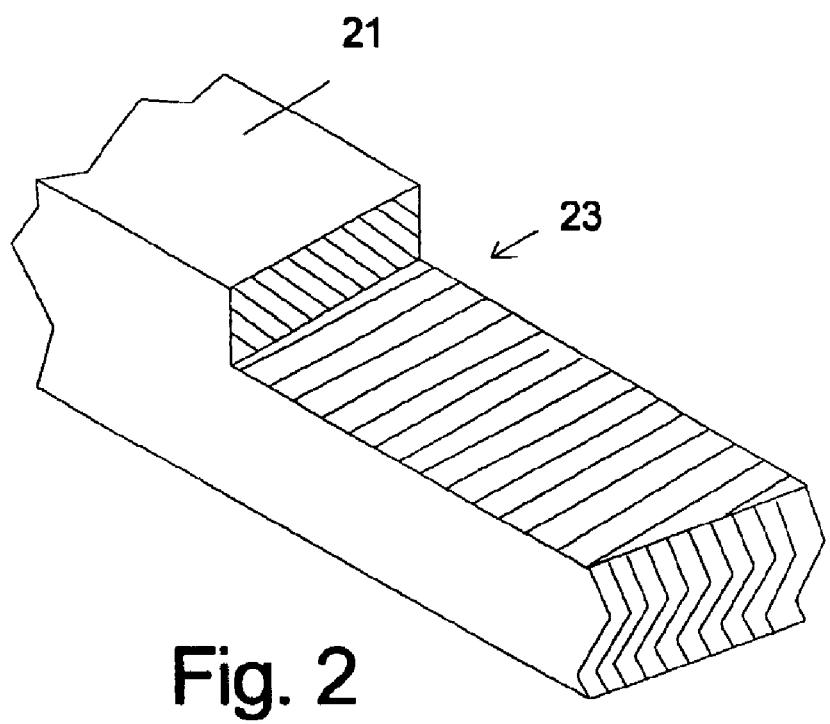
FIG. 2 is an illustration of the effects of slider flying over a section of a line of viscoelastic material applied according to the invention.

FIG. 2 is an illustration of the effects of slider flying over a section of a line of viscoelastic material 21. The slider is very large in comparison the nanometer range fly-height. Sliders are, of course, being made smaller over time, but a realistic width of a slider presently could be 1 mm. Current slider designs fly with the trailing edge nearest to the disk. Therefore, the front edge of the typical slider will clear the ridge of deformable material 10's of nanometers high by a relatively large margin. The trailing edge of the slider will impact the streak and after sufficient revolutions, the streak will have a flattened portion 23. It is preferable that a measurable portion of the ridge be left undisturbed as a control. The ridge in FIG. 2 is illustrated as a rectilinear solid for convenience, but the actual form of the viscoelastic material will be a rounded low mound which is much wider than it is high. Likewise the transition between the undisturbed portion of the ridge and the flattened portion will not be as crisp as shown. Nevertheless, the difference in height between the disk surface, the flatten ridge and the undisturbed ridge can be readily and accurately measured to 0.01 nanometer accuracy.

Once the selected portion of the ridge has been flattened to the fly-height level, the viscoelastic material will maintain the height for a reasonable time so long as it not subjected to undue disturbance. Optionally some way of fixing the material in a longer lasting state could be used. For example, some lubricants are known to harden after exposure to ultraviolet light.

Figure 3:
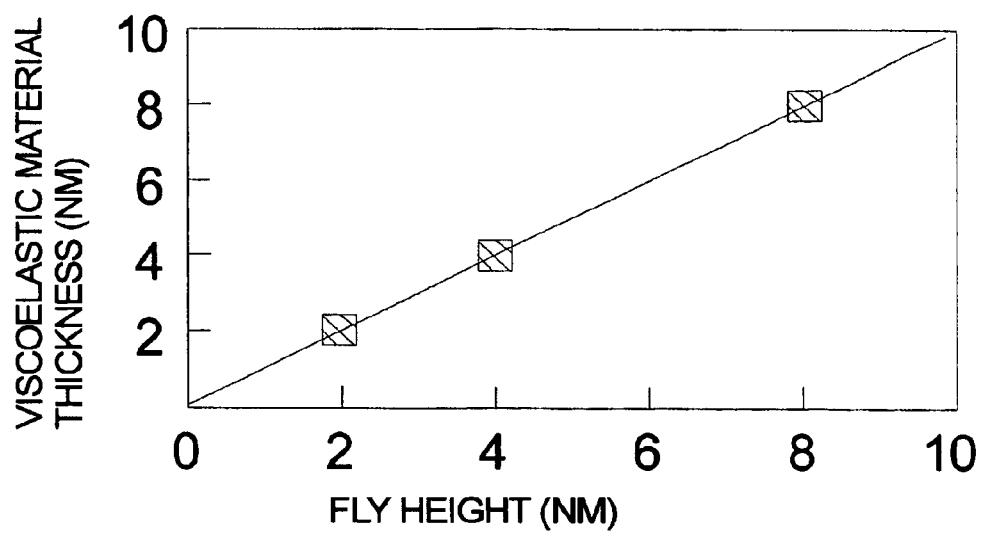
FIG. 3 is a graph of experimental data comparing the known fly-height of three sliders versus the height of the viscoelastic material over which the slider has been flown.

Any available means can be used to measure height of the ridge 44. The applicants used a commercially available ellipsometer of the type made by Candela Instruments to measure the ridge height for three different experimental conditions. An atomic force microscope (AFM) or another form of profilometery could also conveniently be used. In order to test the measurement method, a slider with known linear speed/spacing characteristics was used at various RPMs to generate fly-heights of 2, 4 and 8 nm. The linear fly-height of the slider was independently determined at higher fly-height by interferometry and modeling was used to find the disk speeds corresponding to the lower fly-heights. The results of method of the invention are compared with the values predicted by the model in FIG. 3. The method of the invention resulted in close agreement with the expected values for the three fly-heights.

Alternative embodiments of the invention could use other ways to create structures of deformable viscoelastic material on the disk. Multiple streaks as described above can be used. Small droplets could be sprayed over the disk as an aerosol. Other feasible methods include generating ridges, mounds or smears of material of an appropriate height on a disk area through tribochemical, electrochemical, or triboelectrochemical means. All of these should work well, provided that viscosity of the deformable material is high enough to allow a sufficiently long measurement time window, but not so high so that the slider cannot easily deform it.

The method of the invention has been described with respect to particular embodiments, but other uses and applications for the measurement techniques according to the invention will be apparent to those skilled in the art.

What is claimed is:

1. A method of measuring an air-bearing separating a rotatable surface and a flyable component comprising the steps of:

applying a deformable material to a first area of the surface, the deformable material having a first height which is greater than an anticipated air-bearing height, the first area being small in comparison to a second area where no deformable material is applied;

rotating the surface at a rate sufficient to form the air-bearing;

flying the flyable component over the second area of the surface to form the air-bearing;

impacting a selected portion of the deformable material with the flyable component to reduce the height of the selected portion of the deformable material to a height approximately equal to the height of the air-bearing; and measuring the height of the selected portion of the deformable material.

2. The method of claim 1 wherein the deformable material is a viscoelastic lubricant.

3. The method of claim 1 wherein the deformable material is a non-functionalized perfluoropolyether lubricant.

4. The method of claim 1 wherein the deformable material has a molecular weight of approximately 10 k Daltons.

5. The method of claim 1 further comprising the step of fixing the deformable material after the impacting step and prior to the measuring step.

6. The method of claim 5 wherein the step of fixing the deformable material further comprises exposing the deformable material to ultraviolet light.

7. The method of claim 1 wherein the step of measuring uses ellipsometry.

8. The method of claim 1 wherein the surface is a disk and the step of applying a deformable material further comprises placing a dot of viscoelastic material on the surface and rotating the disk at a rate sufficient to force the dot to move toward an outer diameter of the disk forming a streak of viscoelastic material.

9. The method of claim 1 wherein the step of applying a deformable material further comprises spraying small droplets over the surface as an aerosol.

10. A method of measuring a fly-height of a slider flying over a rotatable disk surface comprising the steps of:

applying a deformable material to a first area of the surface, the deformable material having a first height which is greater than an anticipated fly-height, the first area being small in comparison to a second area where no deformable material is applied;

flying the slider over the rotating disk;

impacting a selected portion of the deformable material with the slider to reduce a height of the selected portion of the deformable material to the fly-height; and measuring the height of the selected portion of the deformable material.

11. The method of claim 10 wherein the deformable material is a viscoelastic lubricant.

12. The method of claim 10 further comprising the step of fixing the deformable material after the impacting step and prior to the measuring step.

13. The method of claim 10 wherein the step of applying a deformable material further comprises placing a dot of viscoelastic material on the surface and rotating the disk at a rate sufficient to force the dot to move toward an outer diameter of the disk forming a streak of viscoelastic material.

14. The method of claim 13 wherein the step of impacting further comprises moving the slider toward an undisturbed portion of the streak of viscoelastic material then keeping the slider at a location adjacent to the undisturbed portion for multiple rotations.

15. A method of measuring a fly-height of a slider comprising the steps of:

applying a dot of viscoelastic material to a surface of a disk;

rotating the disk at a first speed to force the dot to move toward an outer diameter of the disk to form a trail of viscoelastic material higher than an expected fly-height of the slider;

loading the slider onto the disk rotating at a second speed selected for flying the slider;

moving the slider toward an undisturbed portion of the trail of viscoelastic and holding the slider at a position adjacent to the undisturbed portion for multiple rotations to flatten a selected segment of the trail; and measuring the height of selected segment of the trail as the fly-height.

16. The method of claim 15 wherein the viscoelastic material is a non-functionalized perfluoropolyether lubricant.

17. The method of claim 15 wherein the trail of viscoelastic material is tens of nanometers high.

* * * * *